United States Patent
Huang

(10) Patent No.: US 7,027,020 B2
(45) Date of Patent: Apr. 11, 2006

(54) DESIGNING METHOD AND CIRCUIT OF GRAY LEVEL AND LUMINANCE CHARACTERISTIC FOR LIQUID CRYSTAL DISPLAY

(75) Inventor: Shih-Hsiung Huang, Taoyuan (TW)

(73) Assignee: Chunghwa Picture Tubes, Ltd, Taipei (TW)

( * ) Notice: Subject to any disclaimer, the term of this patent is extended or adjusted under 35 U.S.C. 154(b) by 471 days.

(21) Appl. No.: 10/310,873

(22) Filed: Dec. 6, 2002

(65) Prior Publication Data

US 2003/0151576 A1    Aug. 14, 2003

(30) Foreign Application Priority Data

Dec. 7, 2001    (TW) .................................. 90130446

(51) Int. Cl.
G09G 3/36    (2006.01)
G09G 5/00    (2006.01)
G09G 5/10    (2006.01)

(52) U.S. Cl. ............................ 345/89; 345/87; 345/95; 345/96; 345/209; 345/210; 345/690

(58) Field of Classification Search ............ 345/76–83, 345/87–90, 95–104, 204, 690, 36, 45, 47, 345/208–214
See application file for complete search history.

(56) References Cited

U.S. PATENT DOCUMENTS

| 6,008,786 | A | * | 12/1999 | Kimura et al. | 345/89 |
| 6,611,249 | B1 | * | 8/2003 | Evanicky et al. | 345/102 |
| 2004/0036708 | A1 | * | 2/2004 | Evanicky et al. | 345/691 |

* cited by examiner

Primary Examiner—Vijay Shankar
(74) Attorney, Agent, or Firm—Bacon & Thomas, PLLC

(57) ABSTRACT

A designing method and circuit of gray level and luminance characteristic of liquid crystal display are disclosed. A LCD is used to actually measure data about gray level and luminance of the liquid crystal display for building a gray level and luminance database of the liquid crystal display. The characteristic of gray level and luminance at other voltages is calculated to estimate a relation between gray level and luminance using a different driving circuit chip, thereby adjusting internal resistance of the driving circuit chip of the liquid crystal display to have optimal relation between gray level and luminance, and adjusting black signal high voltage, white signal high voltage, white signal low voltage and black signal low voltage to match the display data and generate outputs of a high voltage and a low voltage of each gray level.

4 Claims, 4 Drawing Sheets

DESIGNING METHOD AND CIRCUIT OF GRAY LEVEL AND LUMINANCE CHARACTERISTIC FOR LIQUID CRYSTAL DISPLAY

BACKGROUND OF THE INVENTION

1. Field of the Invention

The present invention relates to the technical field of liquid crystal display driving circuit, and particularly to a designing method and circuit of gray level and luminance characteristic of liquid crystal display.

2. Description of the Related Art

In designing the driving circuit chip of a liquid crystal display (LCD), since it is necessary to provide different gray level voltages to the liquid crystal display, the driving circuit chip needs a plurality of reference voltages to generate gray level voltages for the liquid crystal display. For example, with reference to FIG. 1, for a liquid crystal display of 64 levels, the driving circuit chip 11 needs 10 sets of reference voltages V0~V9 supplied by the power supply circuit 12 for matching 6 bit display data to generate the outputs of 64 high voltage gray levels and 64 lower voltage gray levels. FIG. 2 shows the relation of the input 6 bit display data and the output voltage. The voltages V0~V4 larger than the common voltage VCOM are high voltages, and the voltages V5~V9 smaller than the common voltage VCOM are low voltages. V5 is a white signal low voltage and V9 is a black signal low voltage.

In designing the driving circuit chip, the electric characteristic can be determined according to the specification of the chip. However, this only assures the system to operate normally, while the overall gray level and luminance characteristic of the liquid crystal display can not be estimated. Only after the liquid crystal display is actually completed, it is able to perform the optimal adjustment of the gray level and luminance characteristic based on the reference voltage, which results in increasing the cost and time required for adjustment and design. Moreover, each reference voltage occupies one wire layout on the circuit board. The increment of the reference voltages will increase the number of wires so that the area of the circuit board will be too large, and thus the product can not be made as small as required. Thereby, aforesaid driving circuit chip of a liquid crystal display is not ideal and is necessary to be improved.

SUMMARY OF THE INVENTION

Accordingly, the object of the present invention is to provide a designing method and circuit of gray level and luminance characteristic of liquid crystal display, which can achieve the function of reducing the wires and elements, so as to reduce the cost of the peripheral circuit and shorten the design time.

In accordance with one aspect of the present invention, there is provided a designing method of gray level and luminance characteristic of liquid crystal display, which comprises the steps of: (A) measuring data about gray level and luminance of the liquid crystal display by using a liquid crystal display for building a gray level and luminance database of the liquid crystal display; (B) calculating characteristic of gray level and luminance at other voltages, so as to estimate a relation between gray level and luminance using a different driving circuit chip; and (C) adjusting internal resistance of the driving circuit chip of the liquid crystal display to have optimal relation between gray level and luminance, and adjusting black signal high voltage, white signal high voltage, white signal low voltage and black signal low voltage to match the display data and generate outputs of a high voltage and a low voltage of each gray level.

In accordance with another aspect of the present invention, there is provided a circuit architecture of gray level and luminance characteristic of liquid crystal display, which comprises: an estimating means for measuring data about gray level and luminance of the liquid crystal display by using a liquid crystal display for building a gray level and luminance database of the liquid crystal display, and calculating characteristic of gray level and luminance at other voltages, so as to estimate a relation between gray level and luminance using a different driving circuit chip; and a driving circuit based on the estimated relation between gray level and luminance, and black signal high voltage, white signal high voltage, white signal low voltage and black signal low voltage to match the display data and generate outputs of a high voltage and a low voltage of each gray level.

The various objects and advantages of the present invention will be more readily understood from the following detailed description when read in conjunction with the appended drawing.

DETAILED DESCRIPTION OF THE PREFERRED EMBODIMENTS

Figure 1:
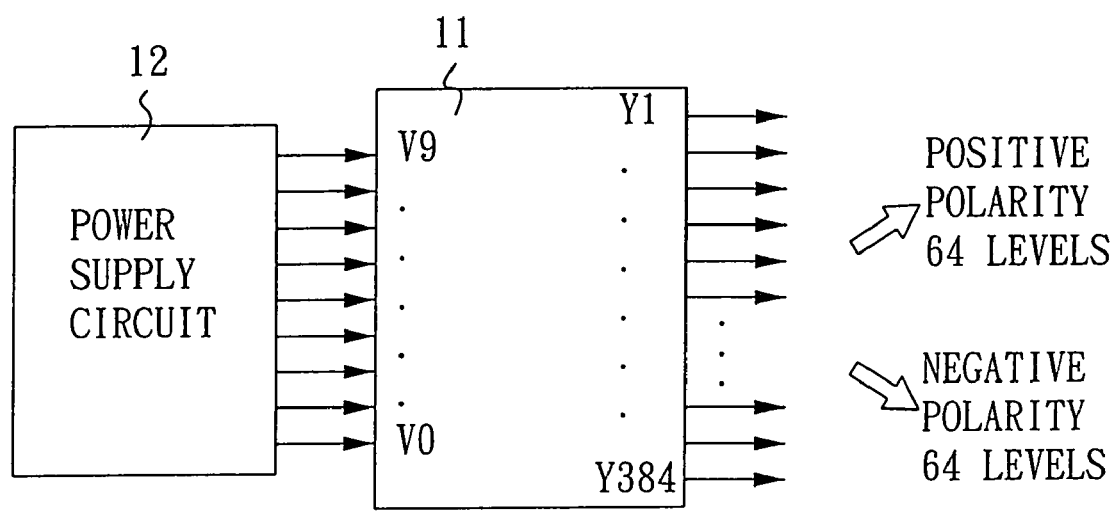
FIG. 1 is a schematic view of a conventional circuit for selecting the driving voltages of a liquid crystal display.
Figure 2:
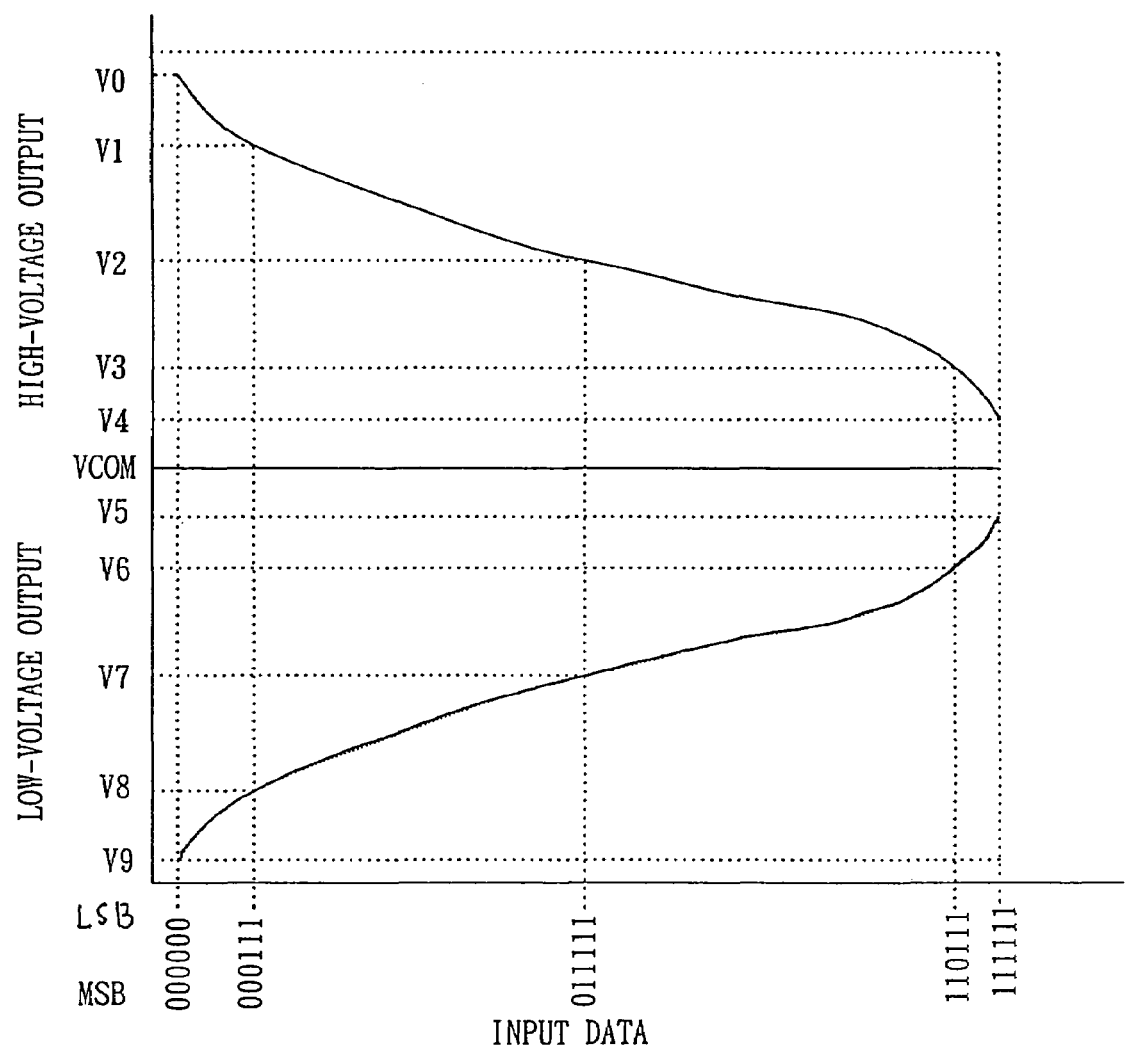
FIG. 2 shows the relation between the display data and output voltage of a conventional liquid crystal display.

The designing method and circuit of gray level and luminance characteristic of liquid crystal display in accordance with the present invention are based on a fact that, theoretically, if the same voltage is applied to all the pixels under the same condition, the gray level and luminance characteristic of the LCD must be the same. Base on this, at a predefined voltage, the gray level and luminance data of a LCD panel is measured and thus a database of gray level and luminance is built. The characteristic of the gray level and luminance characteristic at other voltage can be derived by mathematical operation, and furthermore, the characteristic of the gray level and luminance characteristic at other driving circuit chip can be acquired by this database, as illustrated in the following table.

| Gray level voltage design value | Corresponding luminance | Voltage design value under estimation | Calculated corresponding luminance |
|---|---|---|---|
| $V1n - 1$ | $T1n - 1$ | | |
| $V1n$ | $T1n$ | $V2n$ | $T2n$ |
| $V1n + 1$ | $T1n + 1$ | | |

Assumed that the known gray level voltage design value is $V1n-1$, $V1n$ and $V1n+1$, the corresponding luminance is $T1n-1$, $T1n$ and $T1n+1$, and the voltage design value to be estimated is $V2n$, we have:

(1) When $V1n>V2n>V1n+1$, by the equal difference relation of $(T1n-T1n+1):(T1n-T2n)=(V1n-V1n+1):(V1n-V2n)$, the corresponding luminance is $T2n=T1n-(T1n-T1n+1)*(V1n-V2n)/(V1n-V1n+1)$;

(2) When $V1n-1>V2n>V1n$, by the equal difference relation of $(T1n-1-T1n):(T2n-T1n)=(V1n-1-V1n):(V2n-V1n)$, the corresponding luminance is $T2n=T1n+(T1n-1-T1n)*(V2n-V1n)/(V1n-1-V1n)$; and (3) If the gray level is out of 0 and 63 (a known range), $T2n$ can be derived by external extrapolation.

By above equal difference method, the relation between the derived relative luminance and the gray level can match the practical measuring relation as depicted hereinafter.

A panel using a driving circuit chip of T company is used as an example. The known data includes the voltages form 0 to 63 gray levels and relation of the luminance and gray level before adjustment.

Case 1: The driving circuit chip of T company is used to derive the gray level and luminance characteristic of another voltage setting the same driving circuit chip. With the same LCD and the same driving circuit chip (driving circuit chip of T company), it is desired to acquire a new gray level and luminance characteristic of another voltage setting. At first, with the relation between the input gray level and output voltage provided by the driving circuit chip of T company, it is able to acquire a voltage valves of a newest of gray levels from 0 to 63. By the above process, the adjusted gray level and luminance characteristic can be acquired, as shown in the FIG. 3. It is appreciated that the calculated and luminance matches to the actually measured gray levels. The error is below 1% (0.618%).

Case 2: The gray level and luminance characteristic of the driving circuit chip of H company is used to derive the gray level and luminance characteristic of the driving circuit chip of the T company. With the same LCD but different driving circuit chips, at first, 10 point voltage values (VL0~VL4; VH0~VH4) of the driving circuit chip are set the same as the previous driving circuit chip under the same gray level. By the relation between the input gray level and the output voltage provided by the driving circuit chip, a new set of voltage values for 0 to 63 gray levels is acquired. Similarly, the relation between the gray levels and the luminance of the new driving circuit chip can be acquired, as shown in the FIG. 4. The estimated result matches the actually measured transmission rate. The error is under 1% (0.8333%).

Figure 3:
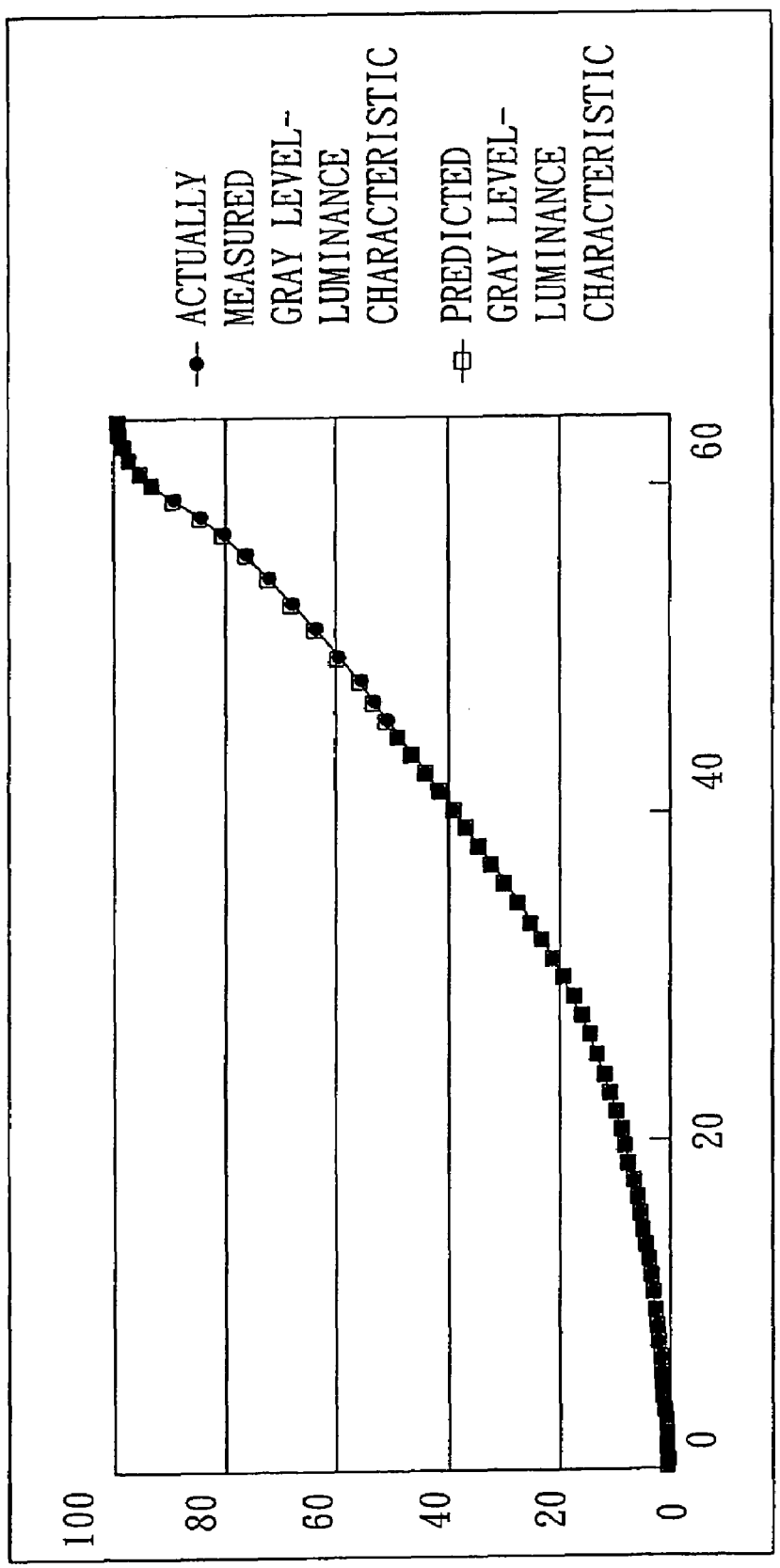
FIG. 3 shows the relation between the gray level and luminance predicted by the method of the present invention.
Figure 4:
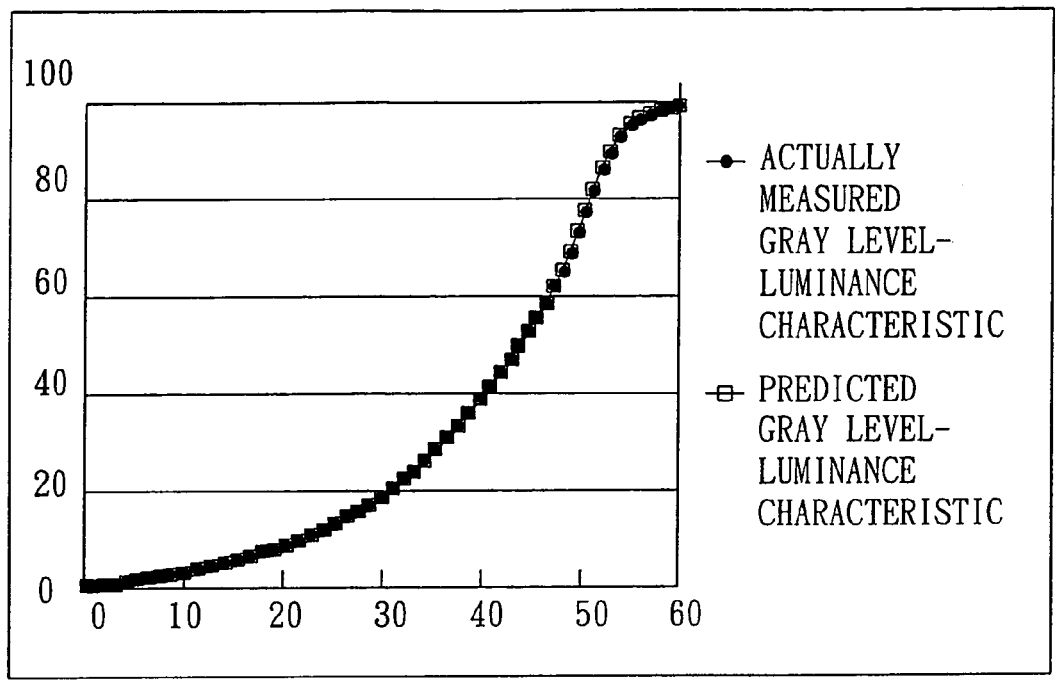
FIG. 4 shows another relation between the gray level and luminance predicted by the method of the present invention.

As shown in the FIGS. 3 and 4, from above result acquired by equal difference method, it is appreciated that this method is reliable.

Figure 5:
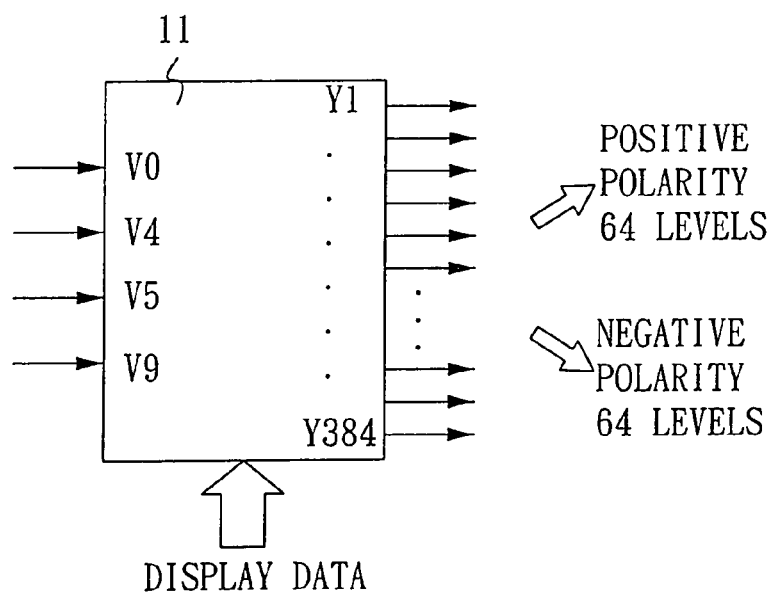
FIG. 5 shows the circuit architecture based on the relation of the predicted gray level and luminance according to the present invention.

Therefore, in designing a circuit, since the relation between the gray level and luminance of the driving circuit chip is determined by predicting the characteristic of a driving circuit chip, as shown in the FIG. 5, the driving circuit chip 51 only needs black signal high voltage V0, white signal high voltage V4, and white signal low voltage V5 and black signal high voltage V9. According to the adjusted relation between the gray level and luminance of the driving circuit chip, the high voltage and low voltage of each gray level can be generated with the display data.

In view of the foregoing, it is known that, in the present invention, the relation between the gray level and luminance of a LCD is determined in advance. Therefore, when designing a driving circuit chip, it is able to integrate the design of the gray level circuit according to required characteristic, so as to reduce the wires and elements. Thus, the cost of the peripheral circuit is reduced, and the design time is shortened.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A designing method of gray level and luminance characteristics of liquid crystal display, comprising the steps of:

(A) measuring gray level and luminance data of the liquid crystal display at a predefined voltage by using a liquid crystal display for building a gray level and luminance database of the liquid crystal display;

(B) using an equal difference method to calculate characteristics of gray level and luminance at voltages other than the predefined voltage, so as to estimate a relation between gray level and luminance using a different driving circuit chip, wherein when a known gray level voltage design value is $V1n-1$, $V1n$ and $V1n+1$, the corresponding luminance is $T1n-1$, $T1n$ and $T1n+1$, and the voltage design value to be estimated is $V2n$, the following luminance and gray level are obtained:

when $V1n>V2n>V1n+1$, the corresponding luminance is $T2n=T1n-(T1n-T1n+1) * (V1n-V2n) / (V1n-V1n+1)$; and when $V1n-1>V2n>V1n$, the corresponding gray level is $T2n=T1n+(T1n-1-T1n) * (V2n-V1n) / (V1n-1-V1n)$; and (C) adjusting internal resistance of the driving circuit chip of the liquid crystal display to have optimal relation between gray level and luminance, and adjusting black signal high voltage, white signal high voltage, white signal low voltage and black signal low voltage to match the display data and generate outputs of a high voltage and a low voltage of each gray level.

2. The method of claim 1, wherein when $V2n$ is out of a known range, an extrapolation method is used to acquire $T2n$.

3. A circuit architecture of gray level and luminance characteristics of liquid crystal display, comprising:

an estimating means for using an equal difference method to measure gray level and luminance data of the liquid crystal display at a predefined voltage by using a liquid crystal display for building a gray level and luminance database of the liquid crystal display, and calculating characteristics of gray level and luminance at voltages other than the predefined voltage, so as to estimate a relation between gray level and luminance using a different driving circuit chip, wherein when a known gray level voltage design value is $V1n-1$, $V1n$ and $V1n+1$, the corresponding luminance is $T1n-1$, $T1n$ and $T1n+1$, and the voltage design value to be estimated is $V2n$, the following luminance and gray level are obtained:

when $V1n>V2n>V1n+1$, the corresponding luminance is $T2n=T1n-(T1n-T1n+1) * (V1n-V2n) / (V1n-V1n+1)$; and when $V1n-1>V2n>V1n$, the corresponding gray level is $T2n=T1n+(T1n-1-T1n) * (V2n-V1n) / (V1n-1-V1n)$; and a driving circuit based on the estimated relation between gray level and luminance, and black signal high voltage, white signal high voltage, white signal low voltage and black signal low voltage to match the display data and generate outputs of a high voltage and a low voltage of each gray level.

4. The circuit architecture of claim 3, wherein when $V2n$ is out of a known range, an extrapolation method is used to acquire $T2n$.

* * * * *